G. BROWN.
TRANSMISSION GEARING FOR MOTOR VEHICLES.
APPLICATION FILED MAR. 31, 1913.
1,113,305.
Patented Oct. 13, 1914.
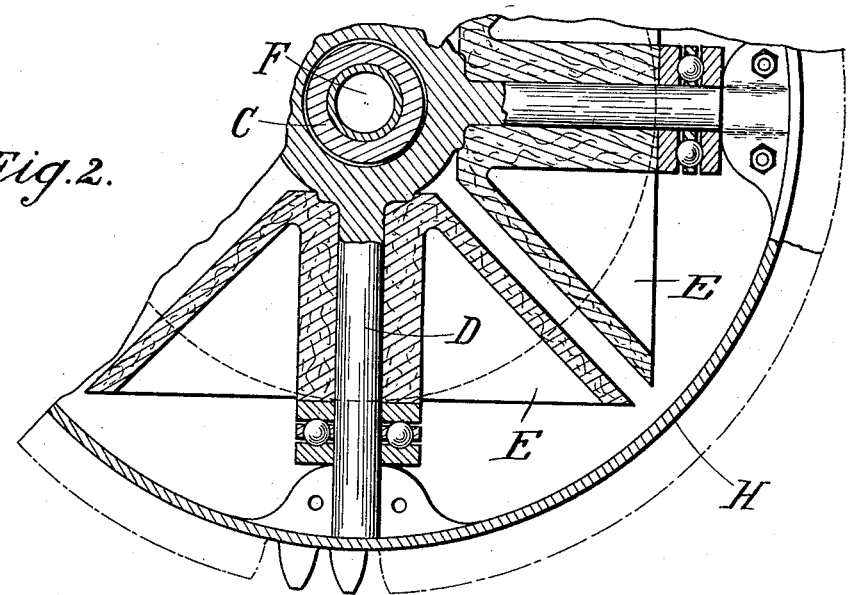
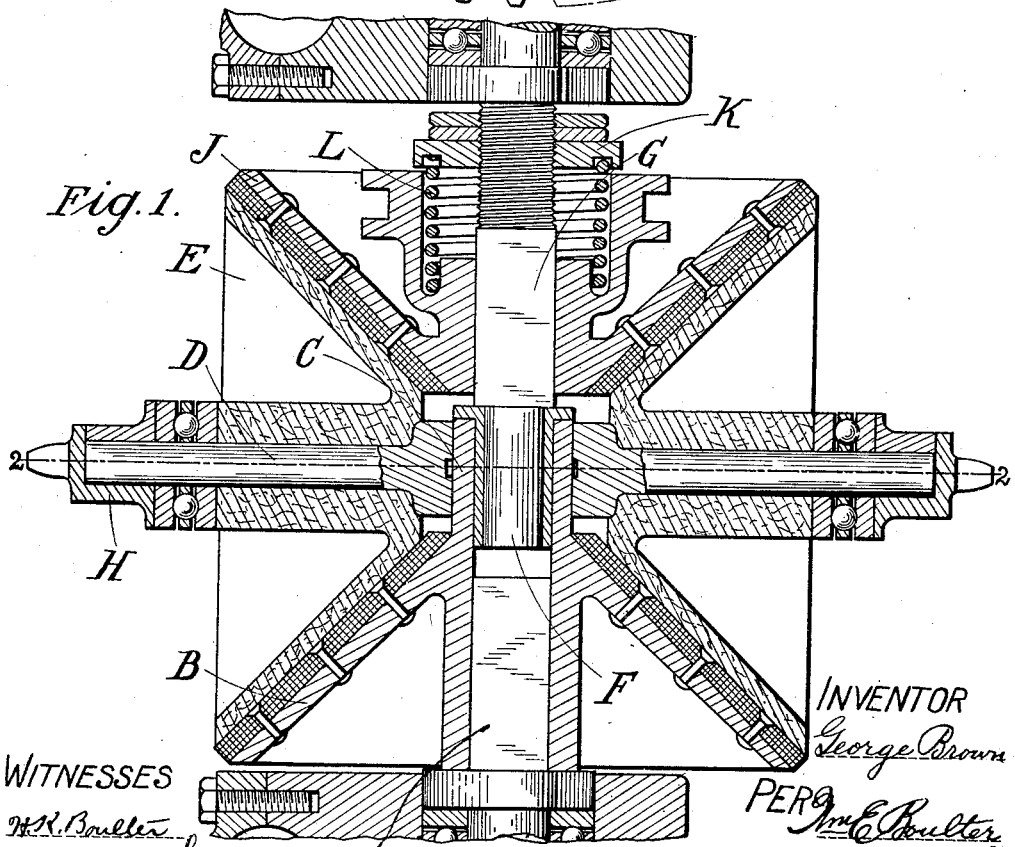

UNITED STATES PATENT OFFICE.

GEORGE BROWN, OF LONDON, ENGLAND.

TRANSMISSION-GEARING FOR MOTOR-VEHICLES.

1,113,305.  Specification of Letters Patent.  Patented Oct. 13, 1914.

Application filed March 31, 1913.  Serial No. 757,999.

*To all whom it may concern:*

Be it known that I, GEORGE BROWN, a subject of the King of Great Britain, and residing at London, S. E., England, have invented certain new and useful Improvements in Transmission-Gearing for Motor-Vehicles, of which the following is a specification.

This invention relates to the transmission gearing of motor vehicles and has for its object to provide a combined differential gearing and friction clutch. The differential gearing is of the bevel type, the satellites being constituted by friction pinions which engage corresponding friction surfaces on the driven shaft sections; and, according to this invention, one driven surface can be withdrawn against a spring so as to constitute a clutch which can be used for starting and similar purposes.

The accompanying drawings show one method of carrying out this invention.

In these, Figure 1 is a longitudinal section of part of a driving axle constructed in accordance with this invention, and Fig. 2 is a transverse section on the line 2—2 of Fig. 1.

Like letters indicate like parts in both views.

In this construction, one driven shaft A of square section carries a fixed friction cone B the boss C of which is adapted to carry the bearing for the star D or the like on which the conical friction pinions E are mounted. Internally the boss may provide a bearing for a part F of the other driven shaft section G. The pinions E consist of conical friction rollers of fibrous material or similar material and the star D is attached to the driving chain sprocket H or the like, and is provided with bearings for the pinions E in the usual way.

The second shaft section G is at one point formed square, or of other non-circular section, and upon this non-circular part slides the movable friction cone J, between which and an abutment K lies a spring L.

The movable flange J is provided with any suitable means enabling it to be withdrawn against the action of the spring, and it will be understood that normally the conical friction pinions E are gripped between the fixed and the movable cones, and impart a differential speed to the cones B and J, and the shaft sections A and G in the usual manner.

To unclutch, the movable cone J is drawn away from the rollers, while to cause the vehicle to move the movable cone J is released, causing the rollers, which previously were revolving idly on their own axes and around the axis of the shaft sections, to be gradually arrested and transmit the drive to the two cones and shaft sections.

The cones employed may be of any suitable type, either of metal coated with some suitable material, such as a fabric consisting mainly of canvas and asbestos, or they may be constructed throughout of fiber or the like.

Preferably the abutment K against which the spring lies is adjustable on the shaft so that the pressure of the spring may be varied as required.

By this invention a very cheap form of differential gearing and clutch is provided, which, by combining these two elements in one construction is capable of application to very low-priced vehicles.

What I claim as my invention, and desire to secure by Letters Patent, is:—

1. In combination, driven shafts, driven friction elements mounted thereon and each having a friction surface, a star mounted freely upon one of said shafts, friction pinions carried by said star in position to be normally gripped between said friction surfaces to impart a differential speed to the said driven friction elements and the shafts, and means for moving one of said driven friction elements on its shaft to cause it to free the friction pinions, substantially as set forth.

2. In combination, driven shafts, a driven friction cone fixed to one of said shafts, a boss on said cone, a star freely mounted on said boss, a second friction cone mounted to slide on its driven shaft, conical pinions carried by said star in position to be normally gripped between the two friction cones to impart a differential speed to the latter and the shafts, a spring engaging said second friction cone, and means for sliding said section friction cone on its shaft to cause it to free the friction pinions, substantially as set forth.

3. In combination, a driven shaft, a friction cone fixed thereto, a boss on said cone, a bearing inside said boss, a second driven shaft engaging said bearing, a bearing outside said boss, a star freely mounted on said outside bearing, friction pinions carried by said star, a second driven cone mounted on said second driven shaft, said friction pinions being in position to be normally gripped between said friction cones to impart a differential speed to the latter and the shafts, means for sliding said second cone on its shaft to cause it to free the friction pinions, an abutment on the said second driven shaft and a spring bearing at one end upon said abutment and at the other end engaging said second cone, substantially as set forth.

In testimony whereof I have signed my name to this specification in the presence of two subscribing witnesses.

GEO. BROWN.

Witnesses:
N. GEERE,
B. SALTER.

Copies of this patent may be obtained for five cents each, by addressing the "Commissioner of Patents, Washington, D. C."